United States Patent [19]
Matsui et al.

[11] Patent Number: 6,126,297
[45] Date of Patent: Oct. 3, 2000

[54] PLANAR COLOR LIGHT EMITTING DEVICE

[75] Inventors: Kazunari Matsui; Yasuo Aritake, both of Isehara, Japan

[73] Assignee: Ichikoh Industries, Ltd., Tokyo, Japan

[21] Appl. No.: 09/086,932

[22] Filed: May 29, 1998

[30] Foreign Application Priority Data

May 30, 1997 [JP] Japan .................................. P9-142515

[51] Int. Cl.$^7$ ........................................................ F21V 9/00
[52] U.S. Cl. ........................... 362/231; 362/97; 362/84; 362/293; 362/249; 362/224; 362/217
[58] Field of Search .............................. 362/231, 97, 84, 362/293, 249, 224, 217

[56] References Cited

U.S. PATENT DOCUMENTS 3,733,480  5/1973  Gleen, Jr. ................................. 362/224

FOREIGN PATENT DOCUMENTS 6-138459  5/1994  Japan .
8-630    1/1996  Japan .

Primary Examiner—Sandra O'Shea
Assistant Examiner—Ronald E. DelGizzi
Attorney, Agent, or Firm—Foley & Lardner

[57] ABSTRACT

A color light emitting device comprises a casing, six tubular light sources within the casing, and a reflecting surface. The casing has a bottom surface portion and a side surface portion extending from a peripheral edge of the bottom surface portion. The reflecting surface is provided on each of the bottom surface portion and the side surface portion. The six light sources are arrayed substantially in parallel with the bottom surface in the order of red, green, blue, red, green and blue. The outer-peripheral surface of the red color light source at one end faces the side surface portion. The reflecting surface has a colored portion that is in the proximity of the red color light source at one end. The colored portion is colored to have a blue color which is not a green color disposed near the red color light source at one end, of the green color and blue color. As a result, in the proximity of the red color light source at one end, the amount of red color light decreases and the amount of blue color light increases. For this reason, the luminance balance in the proximity of the side surface portion at one end becomes uniform as at the central part, whereby color unevenness is suppressed.

8 Claims, 1 Drawing Sheet

PLANAR COLOR LIGHT EMITTING DEVICE

BACKGROUND OF THE INVENTION

The present invention relates to a planar color light emitting device which is used as a backlight for a liquid crystal or the like.

As a backlight for a liquid crystal or the like there is known a planar color light emitting device which uses light sources of three primary colors (red, green and blue) (see Japanese Patent Application Laid-Open Publication No. Hei 6-138459). This planar color light emitting device comprises a casing having an inner surface formed using a reflecting mirror surface and light sources of three primary colors (red, green and blue) disposed side by side within the casing.

However, in the above-described conventional technique, the light emitted from the light source disposed close to a side surface portion of the casing is reflected by a bottom surface portion of the casing and is also reflected in a considerable amount by the side surface portion toward an obverse surface side. For this reason, as a result, it appears that the luminance of the light source located at a terminal end is higher than the luminance of the light source located at a central part of the casing.

Accordingly, at the central part of the casing the luminances of the respective light sources are kept uniformly balanced, whereas in the proximity of the side surface portion of the casing the luminance of the color located at the terminal end is so high that the balance in luminance between this color and another color becomes non-uniform. For example, when simultaneously causing the light sources of the three primary colors to emit light in order to obtain "a white color", the central part of the luminous surface exhibits the white color but, in a case where the terminal light source is blue, the blue color becomes intense in the vicinity thereof. And, in a case where the light source disposed at the terminal end is red, the red color becomes intense in the vicinity thereof. For this reason, it is difficult to obtain a complete white color over an entire luminous surface.

The above-described inconvenience is mitigated by hiding the side surface portion and its vicinity where color unevenness occur by means of a frame or the like. However, in such a structure, the area of the actually usable luminous surface becomes narrowed compared to the size of the planar color light emitting device as a whole.

SUMMARY OF THE INVENTION

An object of the present invention is to suppress the decrease in the area of the effectively usable portion of the luminous surface and to prevent the occurrence of color unevenness in the proximity of the light source at each end.

To attain the above object, according to the present invention, there is provided a color light emitting device comprising:

a casing having a bottom surface portion and a side surface portion extending from a peripheral edge of the bottom surface portion;

three or more tubular light sources exhibiting three primary colors, the light sources being arrayed substantially in parallel with the bottom surface within the casing, the light sources including a terminal light source having an outer-peripheral surface facing the side surface portion, the three primary colors consisting of first, second and third colors, the terminal light source exhibiting the first color, the second color being exhibited nearer to the terminal light source than the third color; and a reflecting surface provided on the bottom surface portion and the side surface portion, the reflecting surface having a colored portion in the proximity of the terminal light source, the colored portion being colored the third color.

According to the above-described structure, the light of the first color from the terminal light source is absorbed by the third-color colored portion provided on at least one of the side surface portion and bottom surface portion. For this reason, there is no possibility that it appears that the amount of light from the terminal light source relatively increase in the vicinity of the side surface portion.

Also, the light source exhibiting the second color is disposed nearer to the terminal light source than the light source exhibiting the third color. For this reason, in the proximity of the terminal light source, the amount of the third color light tends to become relatively deficient. However, since the colored portion is colored to have the third color, the reflection of the third color light is promoted at the colored portion, with the result that the amount of the third color light is relatively increased.

In this way, the amount of the first-color light near to the side surface portion is decreased and the amount of the remote third color light is increased. Therefore, the luminance balance in the proximity of the side surface portion becomes uniform as at the central part, whereby color unevenness is suppressed.

When the side surface portion has a first side surface facing the outer-peripheral surface of the terminal light source and a second side surface crossing the first side surface, the colored portion may be provided on each of the first and the second side surface.

According to the above-described structure, since the colored portion is provided on each of the first and the second side surface, the occurrence of color unevenness in the proximity of the side surface portion is more reliably suppressed.

A diffusion sheet covering the light sources may be provided in opposite to the bottom surface portion.

According to the above-described structure, since the light from the light sources is diffused by the diffusion sheet, the light sources are not seen from the outside. Accordingly, the luminance of the luminous surface is made more uniform.

DESCRIPTION OF THE PREFERRED EMBODIMENTS

Figure 1:
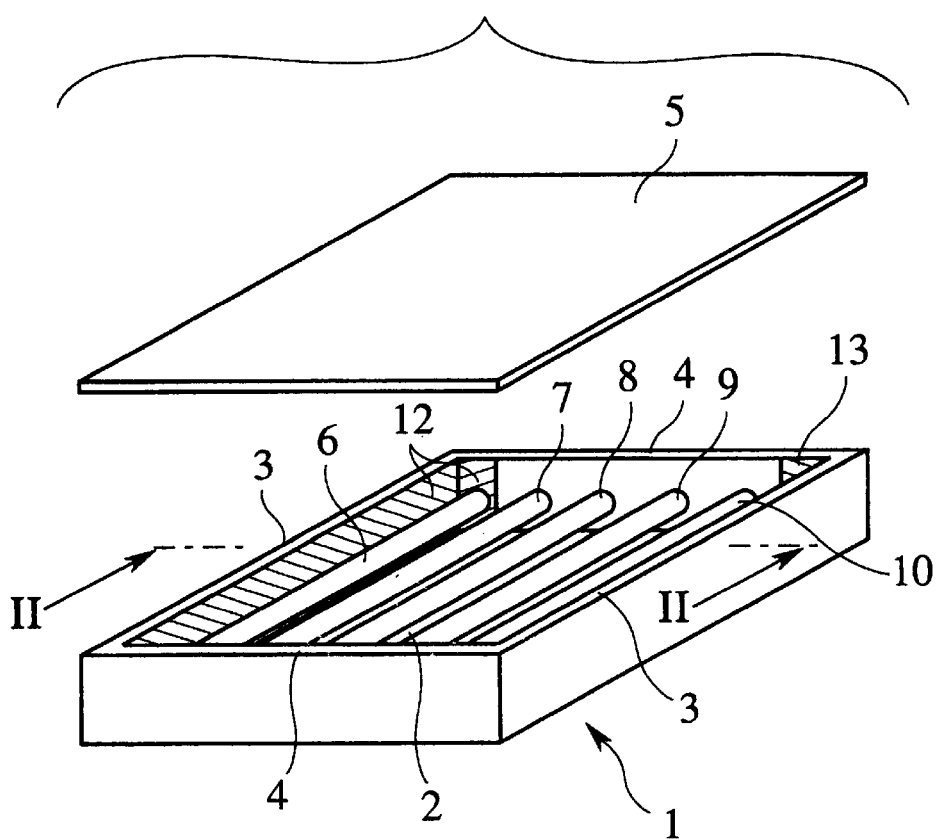
FIG. 1 is a perspective view illustrating a color light emitting device according to an embodiment of the present invention.
Figure 2:
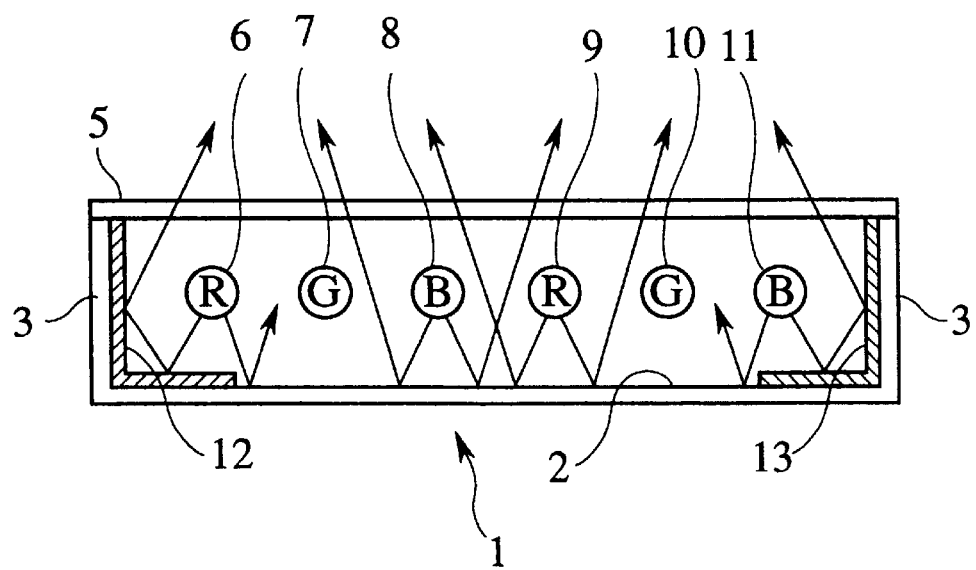
FIG. 2 is a sectional view taken along a line II—II of FIG. 1.

Preferred embodiments of the present invention will now be explained with reference to FIGS. 1 and 2. It is to be noted that in FIG. 2 a reference symbol R represents a red color light source, G represents a green color light source and B represents a blue color light source.

A casing 1 has a bottom surface portion 2 shaped like a substantially rectangular plane and side surface portions 3 and 4 projecting from a peripheral edge of the bottom surface portion 2 in the same direction. Inner surfaces of the bottom surface portion 2 and side surface portions 3 and 4 constitute an inner surface of the casing 1.

A diffusion sheet 5 has a pearskin-like irregularities, whereby light passing therethrough is scattered. The diffusion sheet 5 is mounted on the side surface portions 3 and 4 in such a way as to oppose the bottom surface portion 2.

The inner surface of the casing 1 is covered by a reflecting mirror surface having a high reflection efficiency. As the reflecting mirror surface, there is used a white colored diffusion sheet.

In the interior of the casing 1, there are provided six tubular light sources 6–11. The light sources corresponding respectively to three primary colors (red, green and blue) are contained in the light sources 6–11 two in number for each color. The light sources 6–11 are arrayed in parallel with the bottom surface portion 2. The light sources 6–11 are disposed in the order of red, green, blue, red, green and blue. The both end portions in the longitudinal direction of each of the light sources 6–11 are respectively fixed to corresponding side surface portions 4.

There are provided colored portions 12 and 13, on the side surface portions 3 and bottom surface portion 2 to which the red color light source 6 and blue color light source 11 at both terminal ends of the light sources 6–11 are approached. The colored portions 12 and 13 may be formed by adhering a colored paper or film onto the side surface portions 3 and bottom surface portion 2, or may be formed by a painted film.

These colored portions 12 and 13 are similarly formed also on the side surface portions 4 approached to the end portions of the both terminal end light sources 6 and 11. It is to be noted that the colored portions 12 and 13 may be provided on both of the side surface portions 3 and bottom surface portion 2, or on one of these portions 3 and 2.

To the red color light source 6 there is adjacent the green color light source 7 and, to the green color light source 7, there is adjacent the blue color light source 8. Comparing the distance between the red color light source 6 and the green color light source 7 and the distance between the red color light source 6 and the blue color light source 8, the green color is nearer to the red color light source 6 and the blue color is more remote therefrom. The colored portion 12 in the proximity of the red color light source 6 is colored to have a blue color which is a color remote from the light source 6, of the green color and blue color left by excluding the red color from the three primary colors.

To the blue color light source 11 there is adjacent the green color light source 10 and, to the green color light source 10, there is adjacent the red color light source 9. Comparing the distance between the blue color light source 11 and the green color light source 10 and the distance between the blue color light source 11 and the red color light source 9, the green color is nearer to the blue color light source 11 and the red color is remote therefrom. The colored portion 13 in the proximity of the blue color light source 11 is colored to have a red color which is a color remote from the light source 11, of the green color and red color left by excluding the blue color from the three primary colors.

Next, the function of this embodiment will be explained.

The lights from the four light sources 7–10 at the vicinity of the central part of the casing 1 are transmitted through the diffusion sheet 5 and go outside, as direct light and light reflected from the bottom surface portion 2.

The lights from the light sources 6 and 11 at the both terminal ends are transmitted through the diffusion sheet 5 and go outside as direct light, light reflected from the bottom surface portion 2 and light reflected from the side surface portion 3. Here, since the colored portions 12 and 13, which are colored to have different colors, are provided on the bottom surface portion 2 and the side surface portions 3 in the proximities of the light sources 6 and 11 at the both terminal ends, the lights from the light sources 6 and 11 at the both terminal ends are absorbed by the colored portions 12 and 13.

Accordingly, it does not happen that the amounts of lights from the light sources 6 and 11 increase relatively in and around the zones of the side surface portions 3, with the result that the color over the diffusion sheet 5 becomes a white color which is at the center of a so-called "white color region" adopted by CIE (Commission International de Leclairage). The white color which is at the center of the so-called "white color region" adopted by CIE is determined by visual experiment that is conducted based on the luminances (the proportions of respective brightnesses of the three primary colors felt by the human eyes).

Also, the green color light source 7 is disposed nearer to the light source 6 at one terminal end than the blue color light source 8 and the green color light source 10 is disposed nearer to the light source 11 at the other terminal end than the red color light source 9. Therefore, in the proximity of the light source 6 at one terminal end, the amount of blue color light tends to become relatively deficient and, in the proximity of the light source 11 at the other terminal end, the amount of red color light tends to become relatively deficient.

Here, the colored portion 12 is colored to have a blue color which is one remote from the light source 6, of the two colors (blue and green) left by excluding the color (red) of the light source 6 from the three primary colors. The colored portion 13 is colored to have a red color which is one remote from the light source 11, of the two colors (red and green) left by excluding the color (blue) of the light source 11 from the three primary colors.

Accordingly, at the one terminal end side, the reflection of the blue color light is promoted by the colored portion 12, with the result that the amount of blue color light becomes relatively increased. Similarly, at the other terminal end side, the reflection of the red color light is promoted by the colored portion 13, with the result that the amount of red color light becomes relatively increased.

In this way, since the amount of color light nearer to the side surface portions 3 decreases and the amount of color light remote therefrom increases, the luminance balance in the proximity of each side surface portion 3 becomes uniform as at the central part, whereby color unevenness is suppressed.

Further, since similar colored portions 12 and 13 are provided also on the side surface portions 4 in the proximities of the end portions of the both terminal end light sources 6 and 11, it is possible to reliably suppress the occurrence of color unevenness in the proximity of each side surface portion 4.

In addition, since the lights from the light sources 6–11 are diffused by the diffusion sheet 5 provided on the top of the casing 1, the light sources 6–11 are not seen from the outside, with the result that the luminance at the luminous surface can be made uniform.

It is to be noted that although in this embodiment the light sources 6–11 have been arrayed in the order of red, green and blue, the array order is not limited thereto.

What is claimed is:

1. A color light emitting device comprising:
    a casing having a bottom surface portion and a side surface portion extending from a peripheral edge of the bottom surface portion;

three or more tubular light sources exhibiting three primary colors, the light sources being arrayed substantially in parallel with the bottom surface within the casing, the light sources including a terminal light source having an outer-peripheral surface facing the side surface portion, the three primary colors consisting of first, second and third colors, the terminal light source exhibiting the first color, the second color being exhibited nearer to the terminal light source than the third color; and a reflecting surface provided on each of the bottom surface portion and the side surface portion, the reflecting surface having a colored portion in the proximity of the terminal light source, the colored portion being colored the third color.

2. A color light emitting device according to claim 1, wherein the colored portion is provided on the bottom surface portion.

3. A color light emitting device according to claim 1, wherein the colored portion is provided on the side surface portion.

4. A color light emitting device according to claim 1, wherein the side surface portion has a first side surface facing the outer-peripheral surface of the terminal light source and a second side surface crossing the first side surface, and the colored portion is provided on each of the first and the second side surface.

5. A color light emitting device according to claim 1, wherein the first color is red, the second color is green, and the third color is blue.

6. A color light emitting device according to claim 1, wherein the first color is blue, the second color is green, and the third color is red.

7. A color light emitting device according to claim 1, further comprising a diffusion sheet covering the light sources in opposite to the bottom surface portion.

8. A color light emitting device according to claim 1, wherein the light sources are disposed in such a way that three primary color light sources arrayed in a prescribed order are repeatedly arrayed.

* * * * *